United States Patent

Scherer et al.

[11] Patent Number: 5,889,204
[45] Date of Patent: Mar. 30, 1999

[54] DEVICE FOR DETERMINING THE ENGINE LOAD FOR AN INTERNAL COMBUSTION ENGINE

[75] Inventors: Matthias Scherer, Esslingen; Thomas Ganser, Stuttgart; Rudolf Wilczek, Altdorf, all of Germany

[73] Assignee: Daimler-Benz AG, Germany

[21] Appl. No.: 845,156

[22] Filed: Apr. 21, 1997

[30] Foreign Application Priority Data

Apr. 19, 1996 [DE] Germany .................. 196 15 542.8

[51] Int. Cl.$^6$ .................................................. G01M 15/00
[52] U.S. Cl. ......................................................... 73/118.2
[58] Field of Search .................. 73/112, 116, 117.2, 73/117.3, 118.2; 701/77, 29

[56] References Cited

U.S. PATENT DOCUMENTS

| 5,548,514 | 8/1996 | Hasegawa et al. | 123/479 |
| 5,590,638 | 1/1997 | Nishimura et al. | 123/687 |
| 5,600,056 | 2/1997 | Hasegawa et al. | 73/117.2 |
| 5,642,722 | 7/1997 | Schumacher et al. | 123/673 |
| 5,657,735 | 8/1997 | Maki et al. | 123/673 |

FOREIGN PATENT DOCUMENTS

| 0 345 524 A1 | of 1989 | European Pat. Off. . |
| 0 484 553 A1 | of 1991 | European Pat. Off. . |
| 0 582 085 A2 | of 1993 | European Pat. Off. . |
| 34 16 812A1 | 11/1985 | Germany . |
| 39 34 498A1 | 4/1990 | Germany . |
| 41 00 006A1 | 7/1992 | Germany . |
| 41 22 391A1 | 1/1993 | Germany . |
| 43 41 132A1 | 6/1994 | Germany . |
| 44 22 184A1 | 1/1996 | Germany . |
| 2 190 202 | of 1987 | United Kingdom . |

*Primary Examiner*—Richard Chilcot
*Assistant Examiner*—Eric S. McCall
*Attorney, Agent, or Firm*—Evenson, McKeown, Edwards & Lenahan, P.L.L.C.

[57] ABSTRACT

The invention provides a device for determining the engine load for an internal combustion engine, such device having an input channel for receiving an item of engine speed information, as well as an intake manifold pressure sensor and an air mass flow rate sensor arranged upstream of a throttle valve, and/or a throttle valve angle sensor. The engine speed is fed to a Kalman filter as an input value and at least one of the three variables intake manifold pressure, throttle-valve air mass flow rate and throttle valve angle is fed as a variable measured by the respective sensor. The Kalman filter derives estimated values for the variables intake manifold pressure and throttle-valve air mass flow rate, with which the air mass flowing into a respective cylinder of the engine per working cycle is determined.

2 Claims, 6 Drawing Sheets

DEVICE FOR DETERMINING THE ENGINE LOAD FOR AN INTERNAL COMBUSTION ENGINE

BACKGROUND AND SUMMARY OF THE INVENTION

This application claims the priority of German application 196 15 542.8-52 filed in Germany on Apr. 19, 1996, the disclosure of which is expressly incorporated by reference herein.

The invention relates to a device for determining the engine load for an internal combustion engine.

Such devices are used to determine the air mass passing into a respective cylinder of the engine, per working cycle (i.e. the load), at every engine operating point as accurately as possible, so that precisely the correct associated quantity of fuel can be injected, thus permitting an optimum mixing ratio between the air and fuel, and achieving optimum combustion. Since the air mass flowing into the respective cylinders cannot be measured directly, the engine load must be determined indirectly by means of physical variables associated therewith. These include the intake manifold pressure, the throttle-valve air mass flow rate measured upstream of the throttle valve, and the throttle valve angle, in each case in conjunction with the instantaneous engine speed. In this context, usually a so-called hot-film air mass flow rate meter arranged at the throttle valve is used as a mass air flow rate sensor.

While the determination of the engine load is less problematic during steady-state operation of an engine, during non-steady-state operation the dynamic behavior of the engine components involved (in particular of the intake manifold and of the engine sensor system) present additional difficulties for this determination. Thus, for example, the measurement of both the throttle-valve air mass flow rate and of the intake manifold pressure is disturbed by harmonically vibrating components, caused, inter alia, by the piston travel movement in the individual cylinders, flow influences in the valve openings and the acoustic properties of the intake manifold.

The conventional method for acquiring a non-pulsating engine load value is to form mean values over a number of measurements, depending on the frequency of the pulsation to be suppressed. For example, the throttle-valve air mass flow rate, accompanied by evaluation of the inlet valve opening time and corrected by an engine-speed-dependent characteristic diagram, is measured to determine the air mass passing into the engine. Alternatively, either the throttle valve angle is used in conjunction with a throttle valve angle/engine speed characteristic diagram, or the intake manifold pressure is used in conjunction with the instantaneous engine speed, to determine the load. Such characteristic-diagram-assisted load-determination methods generally require a high application expenditure in the engine control units. While the formation of mean values can achieve satisfactory results in the steady-state case, in the non-steady-state case it provides delayed, and thus correspondingly erroneous, values owing to the low pass filter behavior. When the throttle-valve air mass flow rate measurement is used to determine the engine load, a further source of errors occurs when there is a sudden change in the throttle valve position. This is because such a sudden opening or closing of the throttle valve causes a rapid increase or decrease of the air mass flow rate, which results in a change in the intake manifold pressure, but is only partly expressed in a corresponding change in the air mass flowing into the cylinders.

It is generally known in open-loop and closed-loop control technology to use a so-called Kalman filter to acquire estimated values for state variables which are of interest. A Kalman filter models the real process by means of a prescribed filter algorithm, for which so-called input values (usually control values of the process) are fed to the filter on the input side as fixed values, and so-called measured variables (usually values sensed in the process) are fed to it as variable values. The modelling can take place linearly or non-linearly with the aid of a so-called expanded Kalman filter. The properties of Kalman filters are well know to those skilled in the art.

German patent document DE-OS 41 22 391 A1, discloses the use of a Kalman filter to determine engine speed by means of a position angle measured by a position sensor, so that a mechanical engine speed sensor can be dispensed with German Patent Document DE-OS 34 16 812 A1 discloses an arrangement which uses a Kalman filter to regulate process variables in motor vehicles, such as the driving speed or idling speed.

German patent document DE-OS 43 41 132 A1 discloses an air/fuel ratio estimation device for multi-cylinder internal combustion engines, in which an arithmetic unit of a regulator estimates the air/fuel ratio according to model equations of a Kalman filtering operation. The primary measured variable used in these model equations is the output signal of an air/fuel ratio sensor whose sensing element is arranged in the common exhaust-system section of all the cylinders and whose sensor signal thus represents an air/fuel ratio which is determined indirectly by means of the oxygen concentration of the exhaust gas and represents a mean value over all the cylinders. Further sensor signals fed to the regulator unit are those of a throttle valve position sensor, an intake manifold pressure sensor and of a crank angle sensor.

German patent document DE-OS 41 00 006 A1 discloses the use of a Kalman filter in a mass flow rate measuring unit with a measurement tube functioning as a Coriolis transducer. The measurement signal of the latter is processed with the aid of the Kalman filter in order to estimate flow rate.

A device disclosed in German patent document DE 39 34 498 A1 is intended for regulating the fuel supply for an internal combustion engine. The quantity of air actually taken into the cylinders, in particular during operating phases with rapid acceleration, is estimated in that a regulator unit generates an intake-air-quantity correction signal according to the change in the output signal of a throttle valve position sensor and corrects the output signal of an air quantity sensor by the correction intake-air value.

A control unit for motor vehicles disclosed in German patent document DE-OS DE 44 22 184 A1 has an arithmetic unit for calculating the air mass flowing into a cylinder of an internal combustion engine, in accordance with analytical relationships in which the intake manifold pressure and/or the throttle-valve air mass flow rate constitute calculated, and additionally measured, operating parameters. The algorithm is structured in such a way that it corrects itself as a function of the difference between the calculated operating parameter value and the measured operating parameter value.

One object of the present invention is to provide an engine-load-determination device of the type described above, which reliably determines the engine load, with comparatively little expenditure, even during non-steady-state operation.

To achieve this object the engine-load-determination device according to the invention uses a Kalman filter, to which at least the engine speed is provided as an input variable. One or more of the three variables intake manifold pressure, throttle-valve air mass flow rate and throttle valve angle are also input as variables measured by the respective sensors. From these inputs, the Kalman filter estimates values for the intake manifold pressure and throttle-valve air mass flow rate, based on a suitable model equation and on the known Kalman filter algorithm. The last-mentioned variable is expediently acquired indirectly from estimated values for the effective throttle-valve flow cross-section.

It is apparent that, with such a Kalman filter, highly reliable engine load values can be determined, even during nonsteady-state operation, and even in the case of the failure of one or two of the three sensors for measuring the intake manifold pressure, the throttle-valve air mass flow rate and the throttle valve angle. In conventional systems, the failure of the throttle valve angle sensor, for example, would cause the engine control to fail; the device according to the invention, however, is makes it possible, even in this case, to carry out a reliable dynamic determination of the engine load on the basis of a still intact intake manifold pressure sensor or throttle-valve air mass flow rate sensor.

In one embodiment of the invention, the state variables used for the Kalman filter are the intake manifold pressure, the effective throttle-valve flow cross-section, its first derivative and the air mass flow rate via the throttle valve. The measured variables fed to the Kalman filter are the intake manifold pressure, the throttle valve angle and the throttle-valve air mass flow rate acquired by the hot-film air mass flow rate meter. The effective throttle-valve flow cross-section is treated in the model equations of the filter algorithm as a time-correlated noise variable. With this implementation of the Kalman filter, highly precise and reliable engine load values can be acquired, even in the case of rapid load changes during non-steady-state operation.

Other objects, advantages and novel features of the present invention will become apparent from the following detailed description of the invention when considered in conjunction with the accompanying drawings.

DETAILED DESCRIPTION OF THE DRAWINGS

Figure 1:
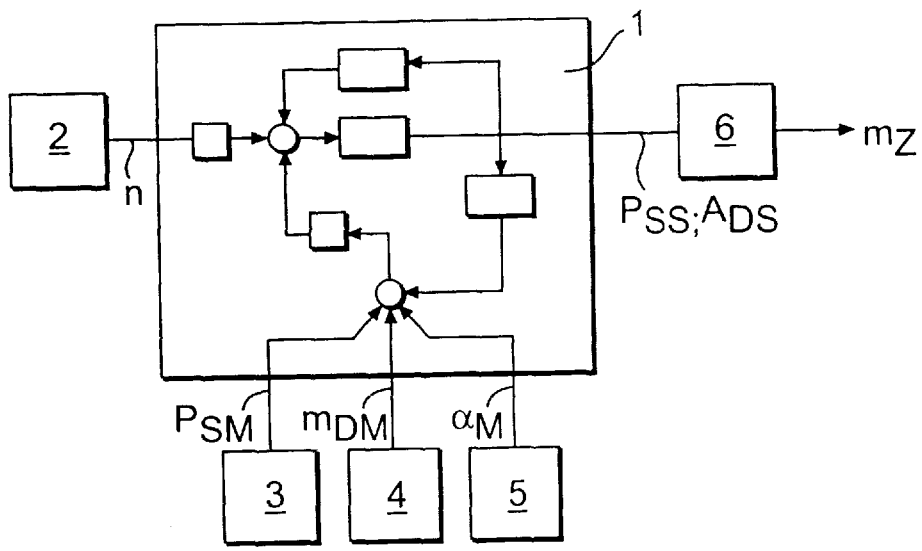
FIG. 1 shows a schematic block diagram of a device for dynamically corrected determination of engine load for an internal combustion engine using a Kalman filter.

As illustrated in FIG. 1, the device for dynamic determination of the engine load contains, as a central element, a Kalman filter (1) to which the engine speed (n) (determined by an appropriate engine speed sensor (2)), is fed as a fixed input value. Alternatively, the engine speed information can also be acquired indirectly in a conventional manner, and fed to the Kalman filter (1). The Kalman filter (1) is integrated into an engine control unit in a fashion which can be readily carried out by a person skilled in the art and of which further details need not be given here. The intake manifold pressure ($p_s$), the throttle-valve air mass flow rate ($\dot{m}_D$) and the throttle valve angle ($\alpha$) serve as measured variables for the Kalman filter. These measurement signals are received by the Kalman filter (1) from an intake manifold pressure sensor (3), a hot-film air mass flow rate meter (4) arranged upstream of the throttle valve and a throttle valve potentiometer (5) which senses the throttle valve angle, respectively.

Figure 2:
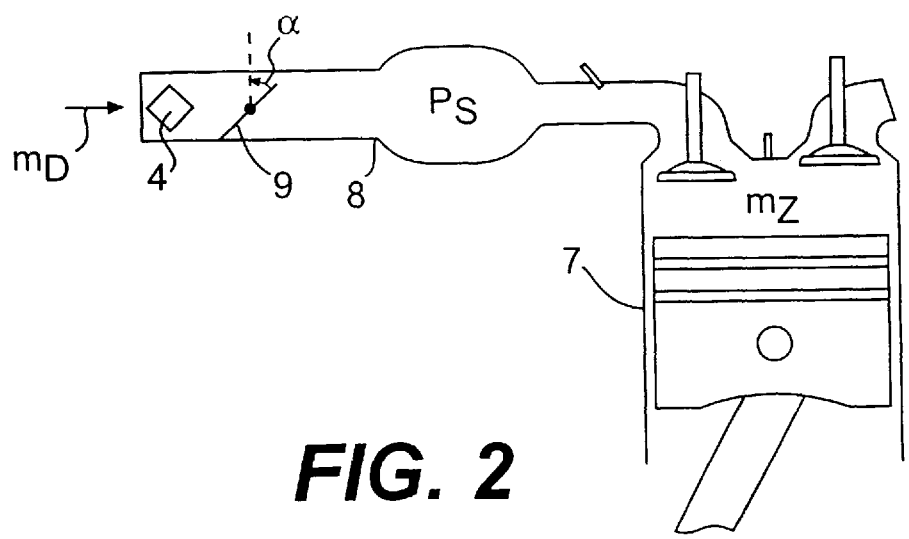
FIG. 2 is a schematic illustration of a cylinder of an internal combustion engine with associated intake region, showing the sensor system used for the device in FIG. 1.

FIG. 2 illustrates the measurement of these variables in the relevant intake region, together with the sensor system for a cylinder (7) of the internal combustion engine, whose engine load is determined by the device according to FIG. 1. The set angle ($\alpha$) of a throttle valve (9) located in the intake manifold (8) is measured by the aforementioned throttle valve potentiometer. The air mass flow rate ($\dot{m}_D$) present upstream of the throttle valve is sensed by the hot-film air mass flow rate meter (4) there, while the pressure ($p_s$) in the intake manifold (8) is measured by the associated intake manifold pressure sensor. The air mass ($m_Z$) (FIG. 1) flowing into the cylinder combustion space per working cycle is sought as a measure of the respective engine load. Assuming that isothermal state changes take place in the intake manifold (8) (a reasonable assumption), the following relationship applies to this:

$$m_Z = m_D + k \cdot (P_{Se} - P_{Sa}),$$

where $m_D$ designates the air mass which has flowed in via the throttle valve (9) per working cycle, $P_{Se}$ designates the input manifold pressure at the end of the working cycle, $P_{Sa}$ designates the intake manifold pressure at the start of a working cycle and k is a proportionality factor which is dependent on the volume and temperature of the intake manifold. The variables which are of interest for determining the engine load are thus the throttle-valve air mass flow rate ($\dot{m}_D$) and the intake manifold pressure ($p_S$).

The Kalman filter (1) shown in FIG. 1 is designed to estimate these two last-mentioned variables. The general structure of a Kalman filter, which is known per se, is shown schematically in FIG. 1. The Kalman filter models process state variables whose change over time is represented as the sum according to a function which is dependent on the state variables and the input values, in this case, the engine speed (n), and a stochastic term which takes into account the interference variables. Estimated measured variable values are determined from the state variable values and are compared with the associated actual (measured) values. The difference between them is weighted by means of a weighting matrix with variable Kalman amplification factors, and is fed back in order to acquire improved state variable values.

The present example uses a four-component state variable vector, with the following components: intake manifold pressure ($p_S$), effective throttle valve flow cross-section ($A_D$), its derivative ($A_D'$) over time, and the throttle-valve air mass flow rate ($\dot{m}_D$) in the form of the modelled signal of the hot-film air mass flow rate meter. The engine speed (n) serves as a single input value while the three-component measurement vector consists of the measured intake manifold pressure ($p_{SM}$), measured throttle valve angle ($\alpha_{DM}$) and actual measurement signal ($\dot{m}_{DM}$) of the hotfilm air mass flow rate meter. The following equation system for the four components $(X_1, X_2, X_3, X_4)^T = (p_S, A_D', A_D, \dot{m}_D)^T$ of the state vector:

$$x_1' = k_1 \cdot \psi(x_1) \cdot x_2 - k_2 \cdot \eta(x_1, n) + W_p$$

$$x_2' = x_3$$

$$x_3' = -x_3/\tau + W_A$$

$$x_4' = k_3 \cdot x_4 + k_4 \cdot \psi(x_1) \cdot x_2 + W_H$$

is used to provide dynamic model equations which take into account both deterministic behavior and disruptive, stochastic behavior. In these equations, $\psi$ is the through-flow function which represents (as a function of the intake manifold pressure, the external pressure and the adiabatic constant) the relationship between the throttle-valve air mass flow rate ($\dot{m}_D$) and effective throttle-valve flow cross-section ($A_D$). The throttle valve is considered as an ideal throttle point, and $\eta$ is a bilinear function which describes the air mass flow rate taken in by the engine, as a function of the intake manifold pressure and the engine speed. Furthermore, in the above equation system the terms $W_p$, $W_A$ and $W_H$ designate respective white measurement noise, $\tau$ designates a correlation time constant and $k_1$ to $k_4$ designate suitable, selectable proportionality factors.

As is apparent from the equation for the effective throttle-valve flow cross-section ($A_D$), this variable is treated as a correlated noise variable, which is both plausible and advantageous. Alternatively, it would be possible to treat this variable as a fixed input value corresponding to the engine speed (n), although this then no longer provides the possibility of estimating this information in the Kalman filter (1), if appropriate from other measured variables.

The relationships between the obtained state variable values and the estimated measured variables which result therefrom, are represented synchronously with the crankshaft at the respective crankshaft angle positions ($\phi_i$), by means of the following equation system:

$$p_{SS}(\phi_i) = x_1(\phi_i) \cdot [1 + A_p \cdot \cos(\omega_p \cdot \phi_i + \phi_A)] + v_p(\phi_i)$$

$$\alpha_{DS}(\phi_i) = a_4 \cdot x_2(\phi_i) + a_3 \cdot x_2^{0.75}(\phi_i) + a_2 \cdot x_2^{0.5}(\phi_i) + a_1 \cdot x_2^{0.25}(\phi_i) + a_0 + v_\alpha(\phi_i)$$

$$\dot{m}_{DS}(\phi_i) = x_4(\phi_i) \cdot [1 + A_m \cdot \cos(\omega_D \cdot \phi_i + \phi_a)] + v_D(\phi_i)$$

Here, ($A_p$) designates the mean-value-related amplitude of the intake manifold pressure pulsations with a frequency $\omega_p$.

Analogously, $A_m$ designates the mean-value-related amplitude of the throttle-valve air mass vibrations with a frequency $\omega_D$. The measurement noise is taken into account by the respective additional terms ($v_p$, $v_\alpha$ and $v_D$). The symbols $\phi_P$ and $\phi_a$ designate the respective phase shifts of the pressure pulsations and the air mass vibrations, while the constants $a_1$ to $a_4$ are development coefficients. In addition to the measurement noise, the deterministic, pulsating interference factors which act on the pressure signal and the air mass signal are thus also taken into account. The amplitudes, frequencies and phase shifts of these interference factors can be determined for example by time series analyses of test bench measurements.

The Kalman filter (1) which is implemented as described above thus provides direct estimated values for the intake manifold pressure ($p_S$), and the effective throttle-valve flow cross-section ($A_D$) is determined, from which an estimated value for the throttle-valve air mass flow rate ($\dot{m}_D$) is derived indirectly. A subsequent calculation stage (6) then uses these two estimated values in accordance with the above relationship to derive the value of the air mass ($m_Z$) flowing into the combustion space of a respective cylinder during a working cycle. The latter of course is the value which is sought to determine the engine load.

FIGS. 3 to 7, are graphic depictions of the results achieved by the device which is designed as described above and is intended for determining engine load. These results illustrate the quality of the dynamically correlated load determination in the case of an assumed load jump at an engine speed of 1500 rpm. In each Figure, three diagrams are represented, showing the intake manifold pressure ($p_S$), the effective throttle-valve flow cross-section ($A_D$) and the throttle-valve air mass flow rate ($\dot{m}_D$), respectively, as a function of crankshaft revolutions ($AK_u$). The characteristic curves ($p_{SS}$, $A_{DS}$, $\dot{m}_{DS}$) which are marked with the additional index "S" represent in these diagrams the estimated value respectively obtained by means of the Kalman filter, while the characteristic curves ($p_{SM}$, $A_{DM}$, $\dot{m}_{DM}$) which are marked with the additional index "M" represent the values actually measured by the relevant sensor system. In the case of the throttle-valve flow cross-section ($A_D$), the value is the signal of the throttle valve angle sensor, the two variables being in a one-to-one relationship with one another, which can be acquired, for example, empirically and represented by a fourth-order polynomial.

Figure 3A:
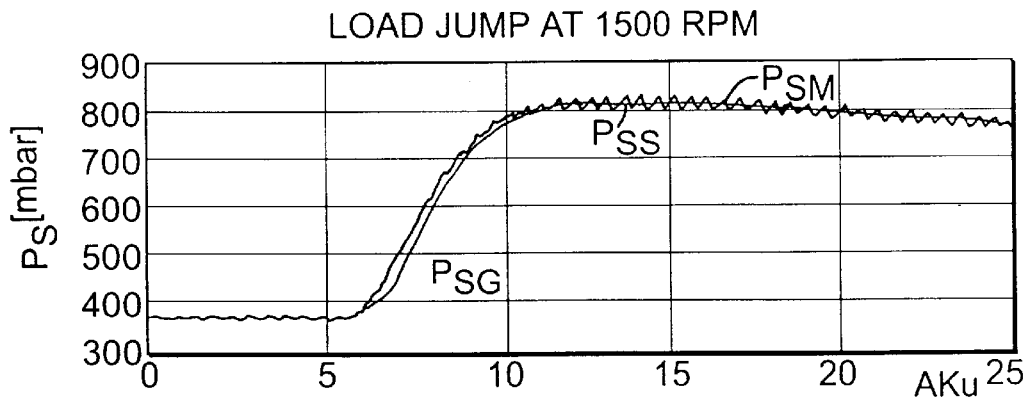
FIGS. 3a–3c are time diagrams for the variables intake manifold pressure, effective throttle-valve flow cross-section and throttle-valve air mass flow rate as a function of the number of crankshaft revolutions in the case of a positive engine load jump for the comparison of estimated and measured values assuming the sensors are satisfactory.
Figure 3B:
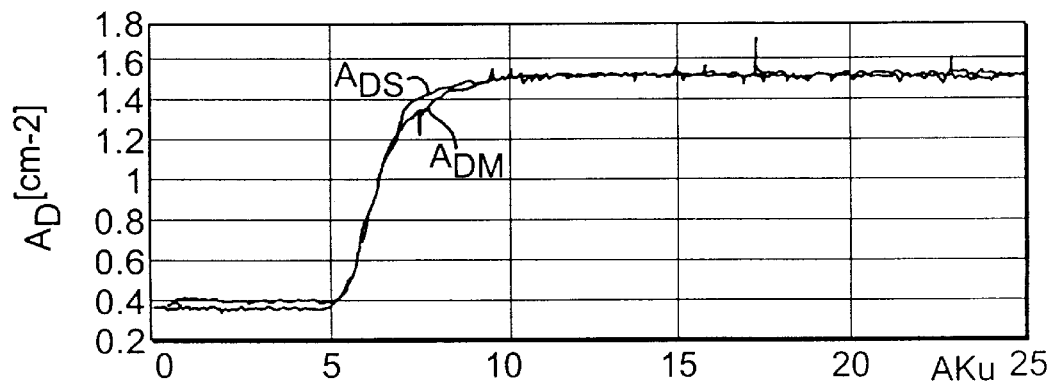
Figure 3C:
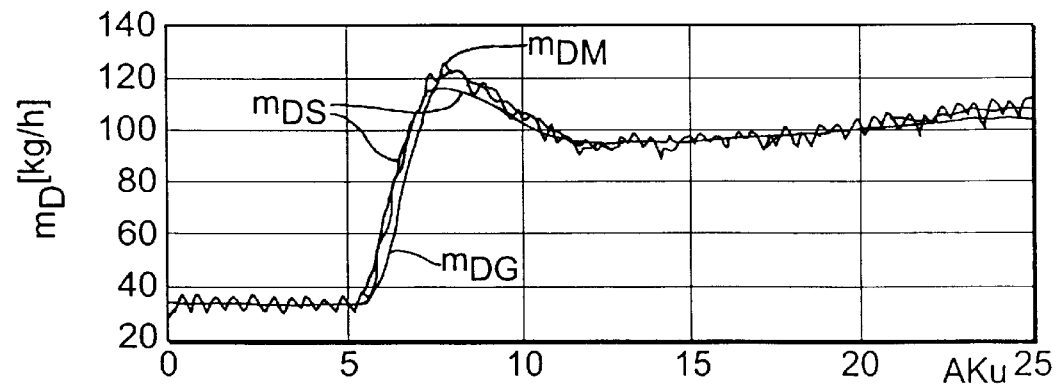
Figure 4A:
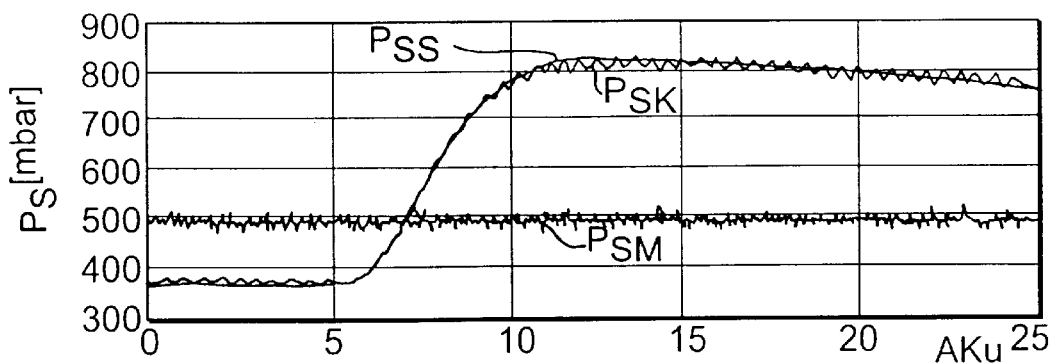
FIGS. 4a–4c show graphs similar to FIG. 3, but assuming a defective intake manifold pressure sensor.
Figure 4B:
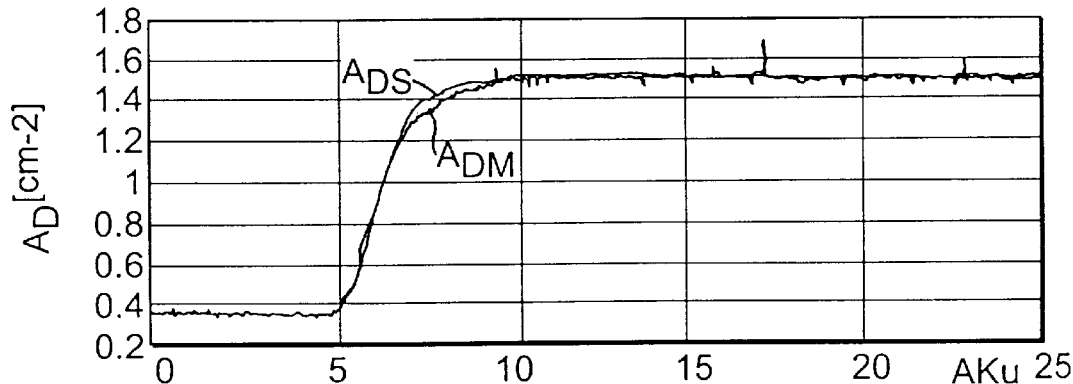
Figure 4C:
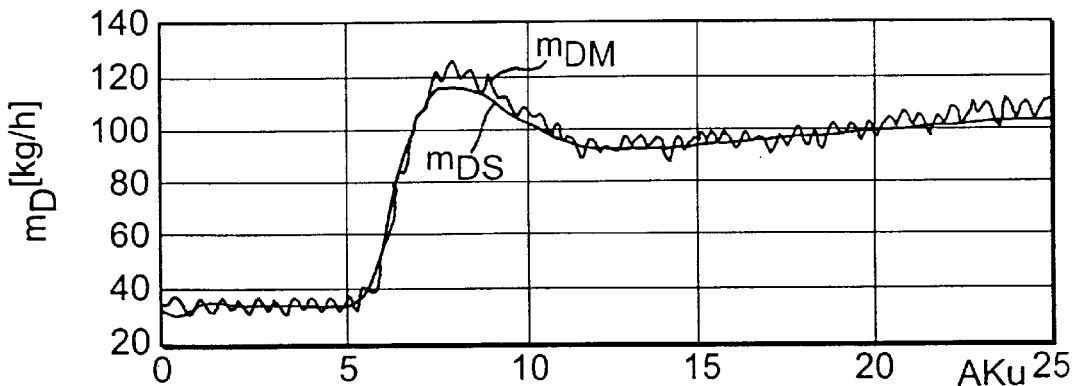

FIGS. 3a–3c show the case in which all the sensors are operating satisfactorily. The measured values ($p_{SM}$, $A_{DM}$, $\dot{m}_{DM}$) obtained by the sensors show the characteristic dynamic pulsations. These latter pulsations, which are disruptive to precise determination of the engine load, are eliminated at the estimated values ($p_{SS}$, $A_{DS}$, $\dot{m}_{DS}$) obtained by the Kalman filter (1). At the same time, these estimated values ($p_{SS}$, $A_{DS}$, $\dot{m}_{DS}$) from the -Kalman filter have a dynamic response which is correctly timed. That is, as is clear from FIGS. 3a–3c, in the load changing phase, the relevant estimated-value characteristic curves follow the respective associated measured-value characteristic curves, without a delay. In contrast, the characteristic curves ($p_{SG}$, $\dot{m}_{DG}$) (represented for comparison in FIGS. 3a and 3c) of averaged measured values which are obtained in a conventional manner (by means of low pass filtering) show an erroneous time delay during the load jump phase. In the steady-state operating phases, the respective estimated values lie correctly on the mean value of the pulsating sensor measured values.

FIGS. 4 to 7 demonstrate that the device according to FIG. 1 generates highly usable estimated values (and thus satisfactory determinations of the engine load) at all times, even in the event of the failure of one or more sensors with which the measured variables are sensed. FIGS. 4a–4c illustrate the case of a defective intake manifold pressure sensor. Accordingly, a constant signal which is subject to noise is shown as output signal ($p_{SM}$) of this sensor, as is shown in FIG. 4a. For comparison, a characteristic curve ($p_{SK}$) which represents the signal which would be output by a functioning intake manifold pressure sensor is additionally depicted there. The diagrams in FIGS. 4a–4c indicate that, despite the erroneous signal of the defective intake manifold pressure sensor, the estimated values ($p_{SS}$, $A_{DS}$, $\dot{m}_{DS}$) from the Kalman filter are still always sufficiently accurate, even in the case of the illustrated load jump, as is clear from the comparison with the signals of the functioning sensors. In particular, despite the defective pressure sensor signal, a correct estimated value for the intake manifold pressure is obtained.

Figure 5A:
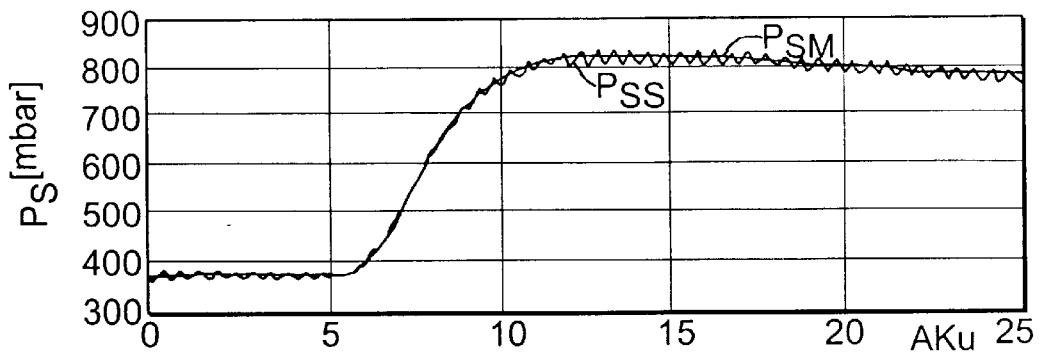
FIGS. 5a–5c show graphs similar to FIG. 3, but assuming a defective throttle valve angle sensor.
Figure 5B:
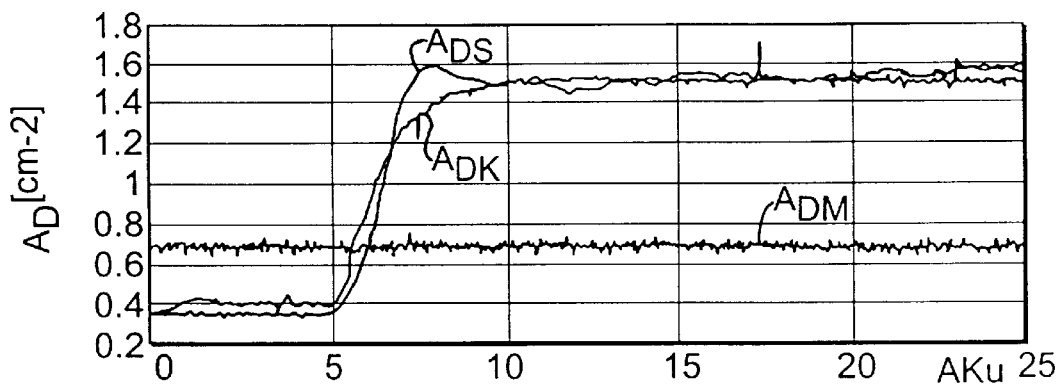
Figure 5C:
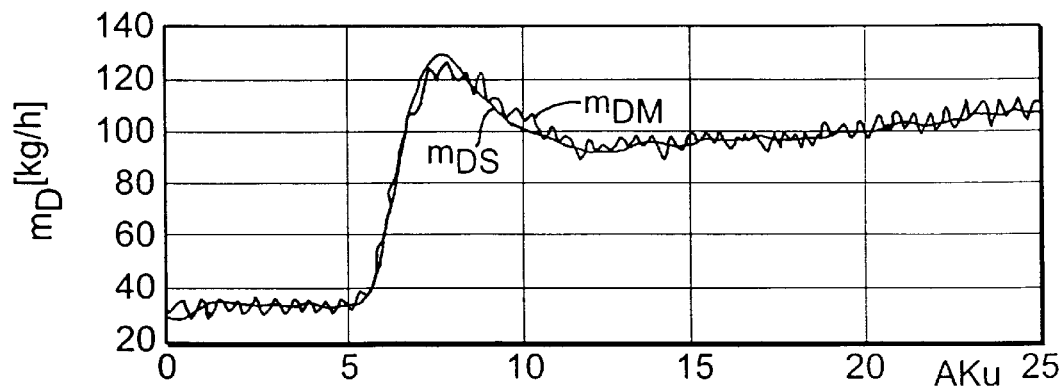

FIGS. 5a–5c are analogous to FIG. 4, but represent, instead of a defective intake manifold pressure sensor, a defective throttle valve angle sensor. FIG. 5b therefore shows a correspondingly constant signal level ($A_{DM}$), subject to noise, for the effective throttle-valve flow cross-section. Here also, sufficiently accurate estimated values ($p_{SS}$, $A_{DS}$, $\dot{m}_{DS}$) are nevertheless obtained by the Kalman filter (1), as is apparent from a comparison with the signal ($A_{DK}$) which would be obtained with a satisfactorily functioning throttle valve angle sensor (represented in FIG. 5b).

Figure 6A:
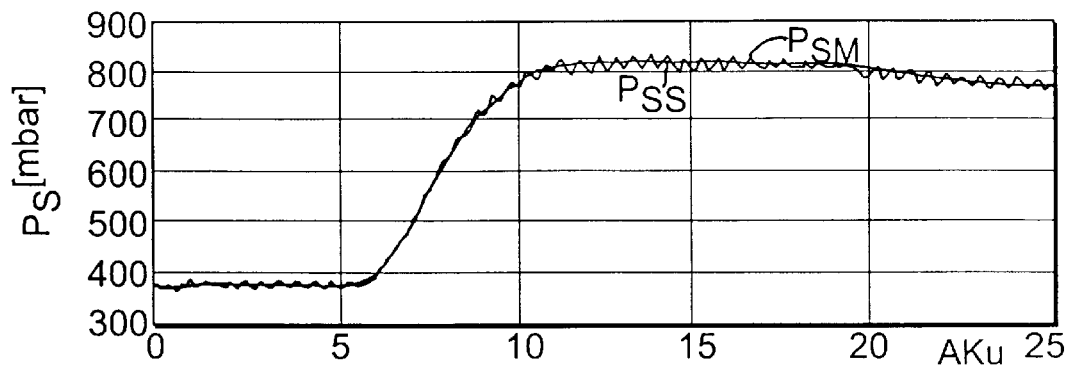
FIGS. 6a–6c show graphs similar to FIG. 3, but assuming a defective hot-film air mass flow rate meter.
Figure 6B:
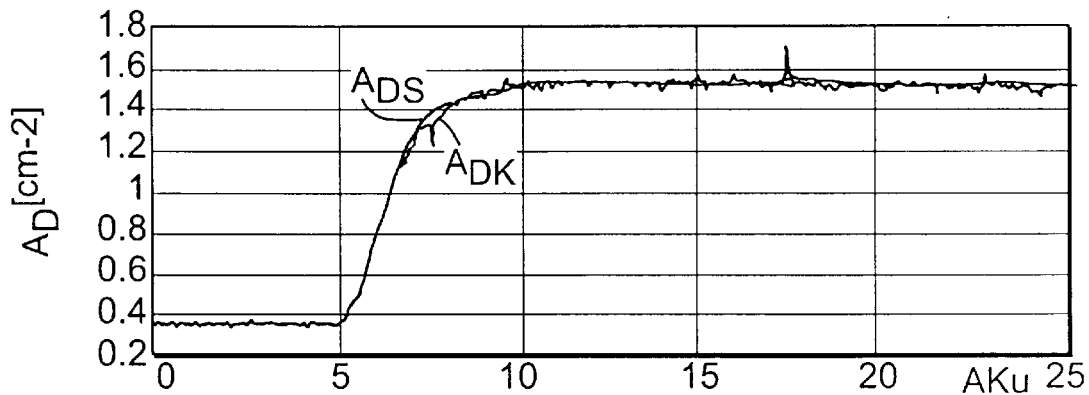
Figure 6C:
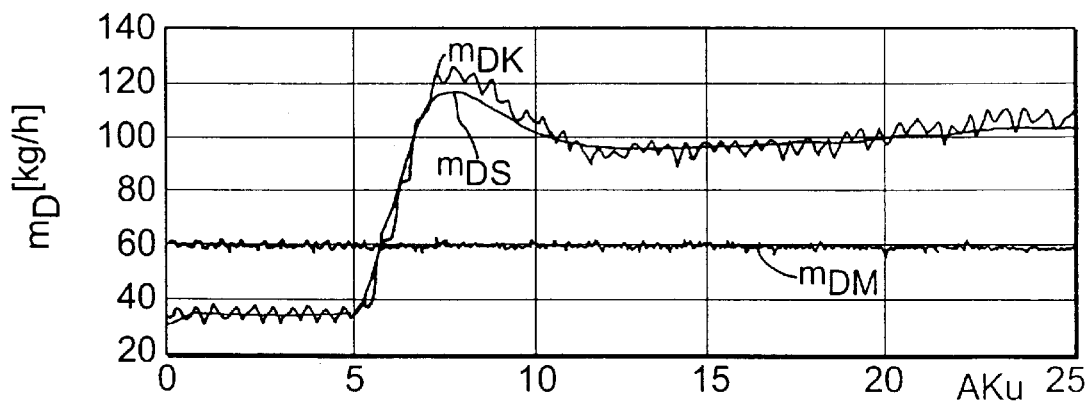

FIGS. 6a–6c show the case of a defective hot-film air mass flow rate meter with a correspondingly constant signal level ($m_{DM}$) subject to noise. Again, the estimated values ($p_{SS}$, $A_{DS}$, $\dot{m}_{DS}$) from the Kalman filter (1) reproduce very satisfactorily the sensor measured values ($p_{SM}$, $A_{DM}$) for the intake manifold pressure and the throttle-valve flow cross-section, while avoiding their pulsations. The signal ($\dot{m}_{DK}$) of a correctly operating hot-film air mass flow rate meter (represented again for comparison purposes) is also adequately reproduced by the relevant estimated value ($\dot{m}DS$) while avoiding the disruptive pulsations.

Figure 7A:
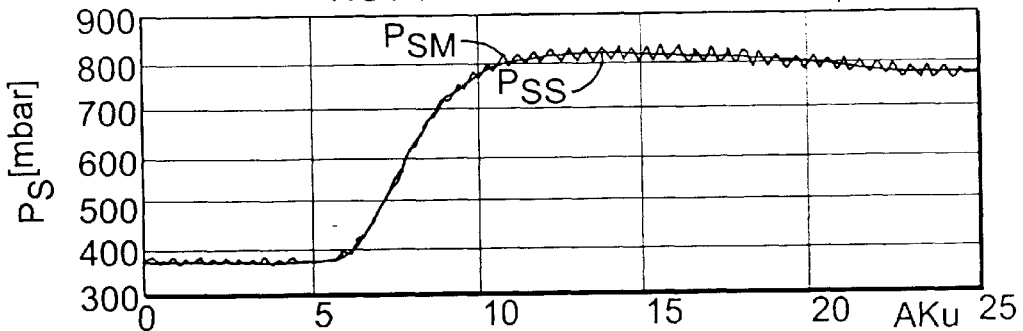
FIGS. 7a–7c show graphs similar to FIG. 3, but assuming a defective hot-film air mass flow rate meter and a defective throttle valve angle sensor.
Figure 7B:
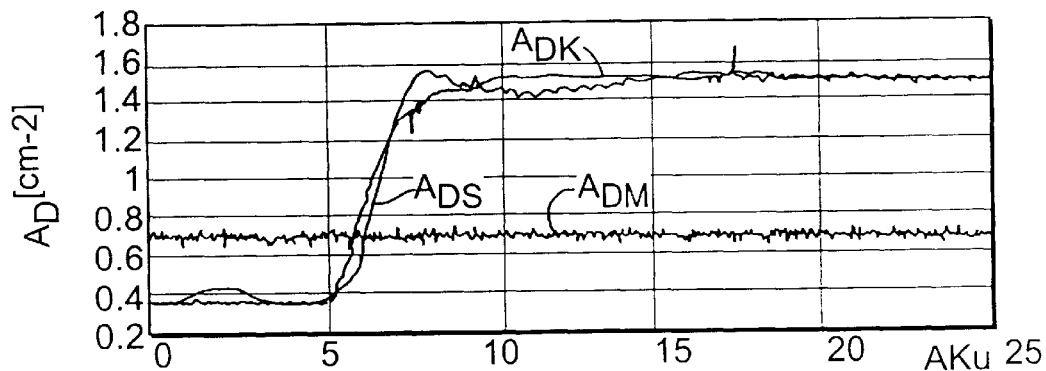
Figure 7C:
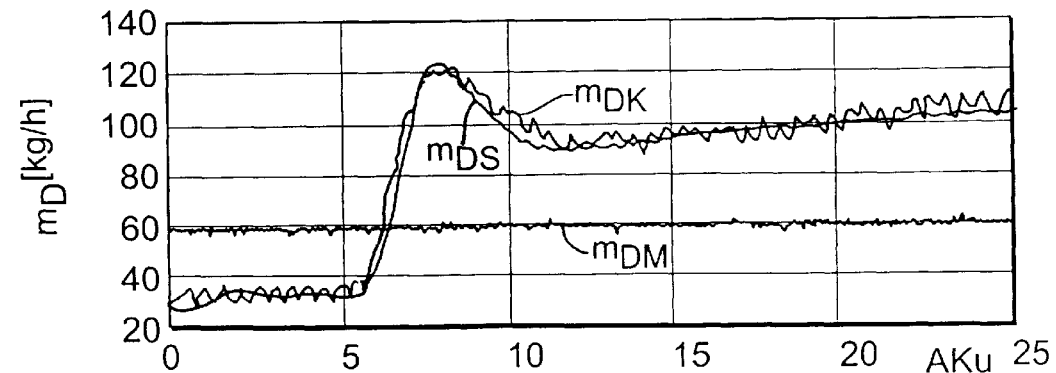

FIGS. 7a–7c show the case in which both the hot-film air mass flow rate meter and the throttle valve angle sensor are defective, again represented by correspondingly constant signal levels ($\dot{m}_{DM}$, $A_{DM}$) which are subject to noise. Whereas, with conventional methods of determining the engine load, such a failure of the throttle valve angle sensor would lead to a failure of the engine control thereby halting engine operation, FIG. 7 shows that the device in FIG. 1 still provides sufficiently accurate estimated values ($p_{SS}$, $A_{DS}$, $\dot{m}_{DS}$) for the intake manifold pressure, the effective throttle-valve flow cross-section and the throttle-valve air mass flow rate by means of the Kalman filter (1). Thus, determination of the engine load continues to be possible, even in this case in which, of the three sensors, only the intake manifold pressure sensor is still operationally capable.

With the device shown, the estimation algorithm suitably implemented in a Kalman filter can thus be used to provide an adequate, dynamically corrected determination of the engine load, not only during steady-state operation of the engine but also during non-steady-state operating phases with a satisfactory degree of accuracy, and without various characteristic curves having to be applied in a costly fashion. Determination of the engine load is thus still possible, even if one or two of the three sensors fail.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for determining engine load for an internal combustion engine, comprising:

an input channel for feeding an item of engine speed information;

at least one sensor selected from the group consisting of a sensor for measuring intake manifold pressure, an air mass flow rate sensor arranged upstream of a throttle valve, and a throttle valve angle sensor; and a Kalman filter to which the engine speed is fed as an input value and at least one of intake manifold pressure, throttle-valve air mass flow rate and throttle valve angle is fed as a variable measured by the respective sensor, said Kalman filter determining from said at least one of three variables, estimated values for variables intake manifold pressure and throttle-valve air mass flow rate; and a calculation unit which determines air mass flowing into a respective cylinder of the engine per working cycle based on said estimated values.

2. Device according to claim 1, wherein said Kalman filter uses as state variables, intake manifold pressure, effective throttle-valve flow cross-section, a derivative of effective throttle valve flow cross section and throttle-valve air mass flow rate;

the measured variables used are the measured intake manifold pressure, the measured throttle valve angle and the measured throttle-valve air mass flow rate; and effective throttle-valve flow cross-section constitutes a time-correlated noise variable.

* * * * *